(12) United States Patent
Kono et al.

(10) Patent No.: US 7,429,844 B2
(45) Date of Patent: Sep. 30, 2008

(54) SERVO UNIT AND JOINT SERVO FOR USE IN A ROBOT SYSTEM

(75) Inventors: Toru Kono, Chiba (JP); Yasuyuki Suzuki, Chiba (JP); Hiroharu Ozawa, Chiba (JP)

(73) Assignee: Futaba Corporation, Chiba (JP)

( * ) Notice: Subject to any disclaimer, the term of this patent is extended or adjusted under 35 U.S.C. 154(b) by 123 days.

(21) Appl. No.: 11/195,780

(22) Filed: Aug. 3, 2005

(65) Prior Publication Data
US 2006/0028164 A1  Feb. 9, 2006

(30) Foreign Application Priority Data
Aug. 6, 2004 (JP) ............................... 2004-231293

(51) Int. Cl.
*G05B 11/32* (2006.01)
(52) U.S. Cl. ..................................................... 318/625
(58) Field of Classification Search .................. 318/254, 318/560–650
See application file for complete search history.

(56) References Cited

U.S. PATENT DOCUMENTS

| | | | | |
|---|---|---|---|---|
| 2,830,243 | A * | 4/1958 | Walcott, Jr. ................ | 318/625 |
| 2,906,983 | A * | 9/1959 | Jenney ........................ | 338/116 |
| 4,267,498 | A * | 5/1981 | Torok ......................... | 318/723 |
| 4,362,977 | A * | 12/1982 | Evans et al. ................ | 700/254 |
| 4,524,313 | A * | 6/1985 | Kuno et al. ................. | 318/563 |
| 4,613,800 | A * | 9/1986 | Jeppsson .................... | 318/434 |
| 7,042,188 | B2 * | 5/2006 | Miura et al. ................ | 318/652 |
| 2003/0015984 | A1 * | 1/2003 | Scheidegger et al. ...... | 318/560 |

FOREIGN PATENT DOCUMENTS

JP  2006-43848  * 2/2006

* cited by examiner

*Primary Examiner*—Lincoln Donovan
*Assistant Examiner*—Erick Glass
(74) *Attorney, Agent, or Firm*—Edell, Shapiro & Finnan, LLC

(57) ABSTRACT

In a robot servo mechanism, the servo mechanism is installed within a L-shaped housing box to make dimension thereof smaller with smaller dead space thereof. In the servo mechanism, each of first and second housing box 41 and 42 of a robot servo unit has a small motor, a reduction unit and a potentiometer. Since, each of the two housing boxes 41 and 42 has L-shaped configuration, each of corresponding connection spaces 41a and 42a surrounded by one dotted chain line can be formed. First and second output shafts 41b and 42b are installed with protrusion into the connection spaces 41a and 42a, respectively. A cross-shaped coupling body 50 having a cross-type through hole formed therein is fitted around the output shaft 41b along a line indicated by an arrow and then fixed thereat by using a screw. Then, the second output shaft 42b of the second housing box 42 is inserted into the cross-shaped coupling body previously fixed at the first housing box 41. As a result, the two housing boxes 41 and 42 are integrated as one body through the use of the cross-shaped coupling body 50, thereby constructing a joint servo of a robot.

19 Claims, 9 Drawing Sheets

SERVO UNIT AND JOINT SERVO FOR USE IN A ROBOT SYSTEM

CROSS-REFERENCE TO RELATED APPLICATIONS

This application claims priority under 35 U.S.C. §§ 119 and/or 365 to Japanese Application No. JP 2004-231293 filed in Japan on Aug. 6, 2004, titled "Servo Unit and Joint Servo for use in a Robot System" the entire contents of which are hereby incorporated by reference.

FIELD OF THE INVENTION

The present invention relates to a servo unit useful to construction of a joint of a remotely controlled or self-controlled artificial robot, and more particularly to a servo unit which is adapted to a joint mechanism of a robot in such a way that rotational angle variations of at least two shafts thereof can be obtained when rotation of an embedded motor is controlled by an external controller and the rotational force thereof is transmitted to a preset outer part through a joint unit.

BACKGROUND

A conventional servo unit to remotely control a target object is normally provided with a motor-driven actuator as a servo mechanism. FIG. 7 shows an example of servo mechanism, wherein inner part of a housing box 10 being a substantially rectangular parallelepiped is depicted as a cross-sectional view.

Referring to FIG. 7, there are represented a small direct current (DC) motor 1 (hereinafter, briefly referred to as "motor"), a motor shaft 2 and an output shaft 3 of a servo, wherein a reduction gear shaft 4 for fitting a plurality of reduction gears therearound is installed intermediately between the motor shaft 2 and the output shaft 3. Although the detail description is omitted, rotational force of the motor 1 is transmitted to the output shaft 3 via a plurality of, e.g., four reduction gear sets connected to the motor shaft 2, the output shaft 3 and the reduction gear shaft 4.

A potentiometer 5 is installed at one end of the output shaft 3 within a housing box 10 to detect the rotation angle thereof. A servo system is configured so that rotation angle of the potentiometer 5 can be fed back to a corresponding circuit in a driving system, thereby controlling rotation angle of the output shaft 3. Reference numerals 6 and 7 represent a power supply cable and a driving circuit board respectively.

This kind of servo mechanism is normally used as a servo product to control a model plane, a ship, an automobile and so on. In this case, an output terminal plate (rotary flange) 8 to drive an arm functioning as an actuator is installed at the other end of the output shaft 3

Recently, there have been various attempts to render a robot to walk and to move like a human body by using such a servo system. Strong concern is focused on a human robot as one of new tastes of people (refer to a reference: Oho-mu company, 2004, A guide to make a two-legged walking robot for ROBO-ONE).

However, the conventional servo mechanism as described above is used as a single unit transmission shaft to control rotation angle of one shaft in one preset rotational direction. For example, there have been suggested no technology to obtain a servo unit capable of offering complex motions thereof which are necessary to control in two shafts directions.

The angle control of two shafts required for a joint motion of a robot can be achieved through configuration of robot servo mechanisms. For example, by constructing two sets of housing boxes having two servo mechanisms shown in FIG. 7, a servo mechanism of a robot can be provided so that the angle control for two shafts being crossed with each other becomes possible. For example, as shown in FIGS. 8A and 8B, two housing boxes such as servo mechanisms shown in FIG. 7 may be coupled by configuring robot servos so that the angle control in a crossed direction thereof becomes possible.

Specifically, there are depicted in FIG. 8A a first housing box 11 and a second housing box 12, each of housing boxes 11 and 12 functioning as a servo unit of a robot, wherein the housing boxes 11 and 12 are perpendicularly coupled to each other via a coupling plate 13. With this structure, the location (angle) of the first housing box 12 can be controlled through a first shaft 11a and at the same time the angle in a vertical direction thereof can be controlled through a second shaft 12a. As a result, joint motion of a robot can be controlled by employing these two robot servo units (i.e., the housing boxes 11 and 12)

In this case, however, size (dimension) of the joint should be large in view of shape of servo in order to construct a robot joint by coupling these servos. Further, the existence of coupling plate 13 to couple two servos makes the joint size larger. Accordingly, in a conventional robot joint servo, it is difficult to minimize the size of the servo system.

Meanwhile, referring to FIG. 8B, since two servo mechanisms described above (i.e., the housing boxes 11 and 12) are fixed by simply piling up one on another in 90°, size (dimension) of the servo system shown in FIG. 8B becomes smaller than that of the servo system shown in FIG. 8A. However, with the structure of the servo system shown in FIG. 8B, angle control for the shaft 11 a perpendicular to the ground and angle control for the horizontal shaft 12a are apart and deviated with each other in the vertical direction as shown in FIG. 8. Accordingly, control program to control motion thereof with a two-degree-of-freedom becomes complex; further, the operating program to drive a corresponding robot becomes complex. The joint motion also becomes unnatural.

In the description stated above referring to FIGS. 8A and 8B, for simplicity, description for frames necessary to configure a servo as a joint of a robot is omitted. From now on, a servo construction procedure employing frames will be described. First, the first housing box 11 composing a servo unit is inserted into a coupling frame 13A along a direction indicated by an arrow "A" and then fixed thereat, wherein the coupling frame 13A being bended in a "n" shape as depicted in FIG. 9. Then, the second housing box 12 which have been mounted and then fixed on a small frame 13B along a direction indicated by an arrow "B" is attached under the coupled frame 13A along a direction indicated by an arrow "C". As a result, the first housing box 11 and the second housing box 12 are coupled as one body, thereby forming two rotational driving shafts 11a and 12a. Finally, a robot joint unit is configured.

However, as described referring to FIGS. 8A, 8B and 9, in a conventional robot joint unit constructing technique by coupling radio control type single shaft servos, dimension of the joint unit becomes larger when a robot joint unit is composed by using two shafts mechanism to accomplish a joint part of a robot while there entails an offset in two rotary output shafts if the joint unit becomes smaller.

There has been suggested a robot unit set capable of functioning as various robot joints, the robot unit set being configured by coupling a plurality of mechanisms with each other by means of joint members, wherein the robot unit set includes the mechanisms having a rotational driving shaft embedded therein along a right angle direction in a substantially cubic shaped housing box, respectively.

However, in order to accomplish this kind of robot unit set, embedded mechanism representing a two-degree-of-freedom should be installed in a single housing box. As a result, there entails considerable cost increase to develop such a robot unit set (see, e.g., international publication No. WO 2001/062448).

SUMMARY

It is, therefore, an object of the present invention to solve a problem that when a conventional robot joint unit (e.g., being developed as a radio control type) capable of controlling rotation angle of two shafts is configured by employing a robot servo mechanism, the so-called dead space becomes larger and in turn, dimension of the robot joint unit becomes larger.

It is another object of the present invention to provide a servo unit of a robot and a joint servo of a robot with a cheaper price in such a way that angle control with a two-degree-of-freedom is possible without incorporating dead space although there is a burden of a design know-how for a robot joint with a two-degree-of-freedom, R&D cost thereof and cost increase to manufacture certain parts.

In accordance with a preferred embodiment of the present invention, there is provided a servo unit for use in a robot system including: a driving motor; one or more reduction mechanisms for reducing rotational speed of the driving motor; an output shaft which is coupled to a final rotational shaft of said one or more reduction mechanisms; and a potentiometer for detecting rotational angle variation of the output shaft, wherein the driving motor, one or more reduction mechanisms, the output shaft and the potentiometer are installed within a L-shaped housing box and the output shaft faces a connection space formed by the L-shaped housing box.

In accordance with another preferred embodiment of the present invention, a servo unit of a robot is configured by coupling two servo units described above in such a way that portions of two output shafts protruded into the connection space are crossed with each other and fixed by a cross-shaped coupling body within the connection space, thereby forming a servo mechanism capable of being driven as one body with a two-degree-of-freedom.

In a servo unit of a robot of the present invention, location of a potentiometer may be changed by using or modifying a conventional radio control type servo mechanism so that the potentiometer is deviated from the output shaft and the servo unit is configured to have a L-shaped configuration. As a result, the output shaft to control rotational angle thereof is inserted with protrusion into the connection space, thereby easily adapting one kind of servo mechanism either to one-shaft servo or two-shaft servo.

Further, in a servo unit for use in a robot system of the present invention, the output shaft can be inserted with protrusion within the connection space. Accordingly, two servo units can be configured through the use of the cross-shaped coupling body. As a result, it becomes easy to configure a joint servo which has very small dead space. Since rotational center axes of the two shafts crossed at a right are located on a same plane, it becomes easy to design an operating program to control the joint servo; and in realizing motion of a leg or an arm of a human body, a corresponding part of a human robot may be made with extremely high accuracy.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Figure 1:
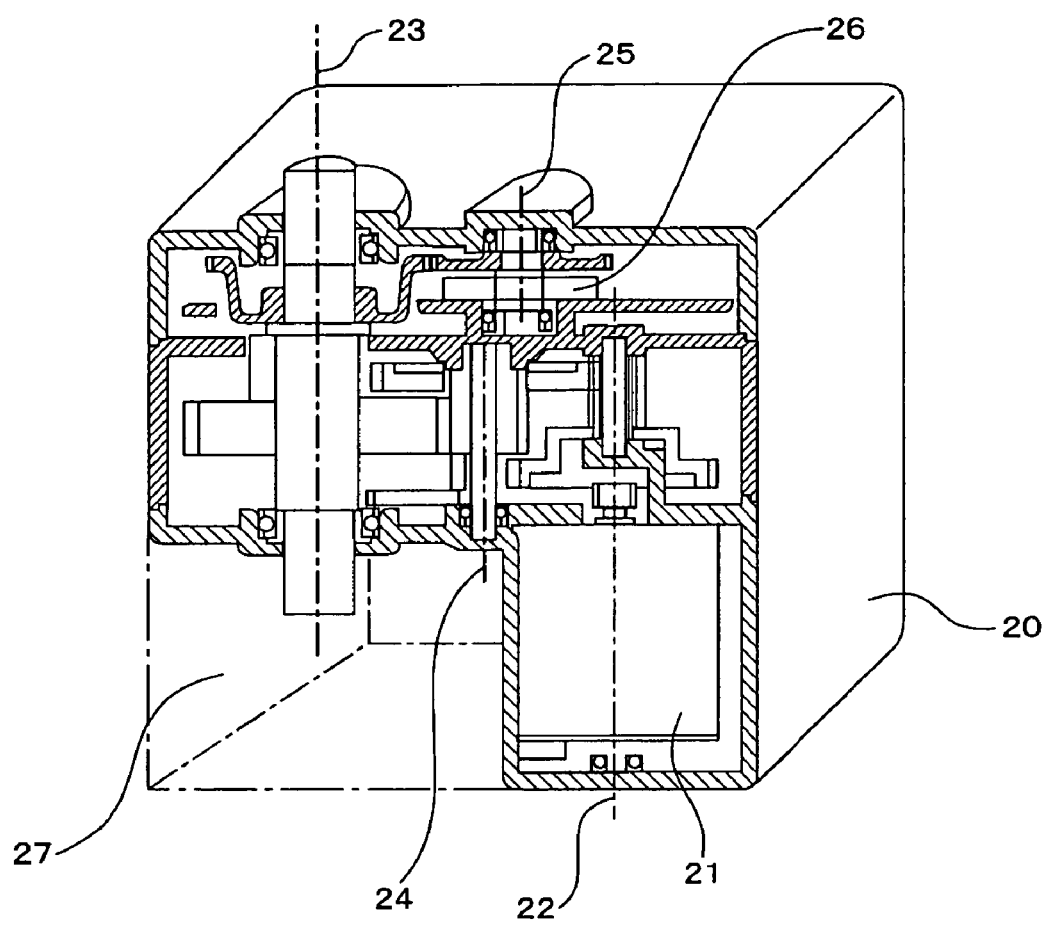
FIG. 1 shows a perspective view of inner part of a servo unit of a robot in accordance with a preferred embodiment of the present invention, wherein the inner part thereof is revealed as a partial cross sectional view.

FIG. 1 shows a perspective view of inner part of a servo unit of a robot in accordance with a preferred embodiment of the present invention, wherein the inner part thereof is revealed as a partial cross sectional view.

As shown therein, a reference numeral 20 represents a housing box of a servo unit of a robot, wherein the housing box 20 is composed of an "L" shaped rectangular parallelepiped. For this reason, substantially rectangular parallelepiped shaped space 27 surrounded by one dotted chain line is formed in the housing box 27. A joint servo mechanism which will be described later can be constructed within this space 27 (hereinafter, referred to as "connection space"). A small DC motor 21 to drive a servo is fixed in the housing box 20. A plurality of reduction gears is disposed between the motor shaft 22 of the motor 21 and an output shaft 23 for taking out rotational force via a reduction gear shaft 24.

The output shaft 23 is axially supported thereby and passes through the housing box 20, wherein one end thereof faces the connection space 27 and is protruded into the connection space 27.

A toothed wheel made of elastic resin material is interposed between a potentiometer shaft 25 and the output shaft 23 in inner space of the housing box 20 near the other end of the output shaft 23, wherein rotational angle variation of the output shaft 23 is converted into a corresponding electrical signal by the potentiometer 26.

Figure 2:
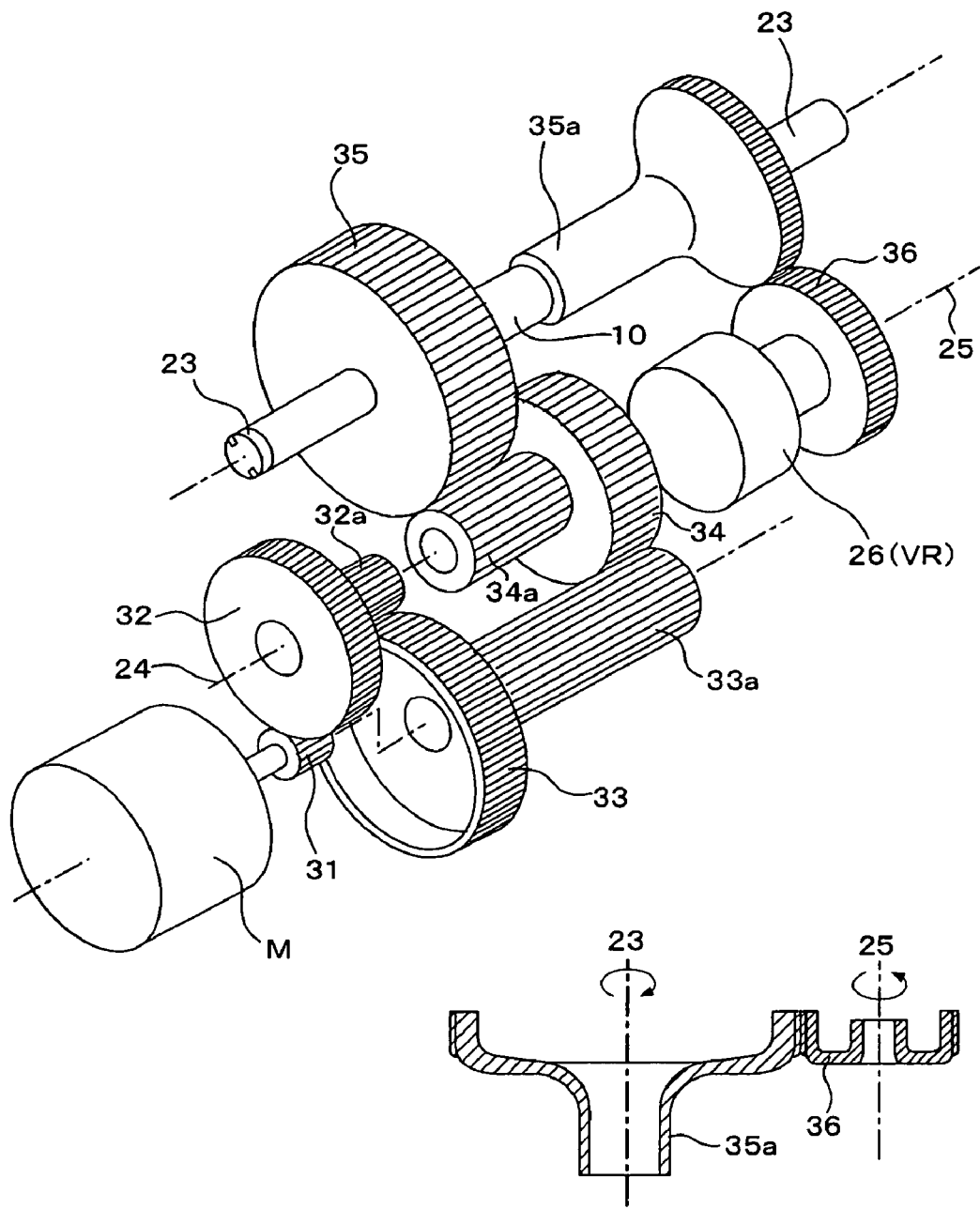
FIG. 2 exhibits a view for use in description of toothed wheels representing a reduction unit of a robot servo unit in accordance with a preferred embodiment of the present invention.

FIG. 2 exhibits an exploded perspective view of the reduction gears shown in FIG. 1. Referring to FIG. 2, first reduction gears 31 and 32 are engaged with each other between a shaft of a motor M and the reduction gear shaft 24; the small toothed wheel of the reduction gear 32 is engaged with third reduction gears 33a and 34 via second reduction gears 32a and 33. Further, the small toothed wheel of the reduction gears 34 includes fourth reduction gears 34a and 35. With such a configuration, the rotational force of the motor M is transmitted to the above-mentioned output shaft 23.

The output shaft 23 is engaged with fifth transmission gears 35a and 36, which can rotate the potentiometer 26 fixed to the potentiometer shaft 25. As illustrated in a separate cross sectional view in FIG. 2, the fifth transmission gears 35a and 36 are tightly engaged with each other so that two toothed wheels thereof made of elastic resin material having a little elasticity make a pressurized contact with each other. As a result, it becomes possible to precisely transmit a rotational angle variation of the output shaft 23 toward the potentiometer 26 without generating the so-called back-rush which is frequently generated in a gear mechanism.

Figure 3:
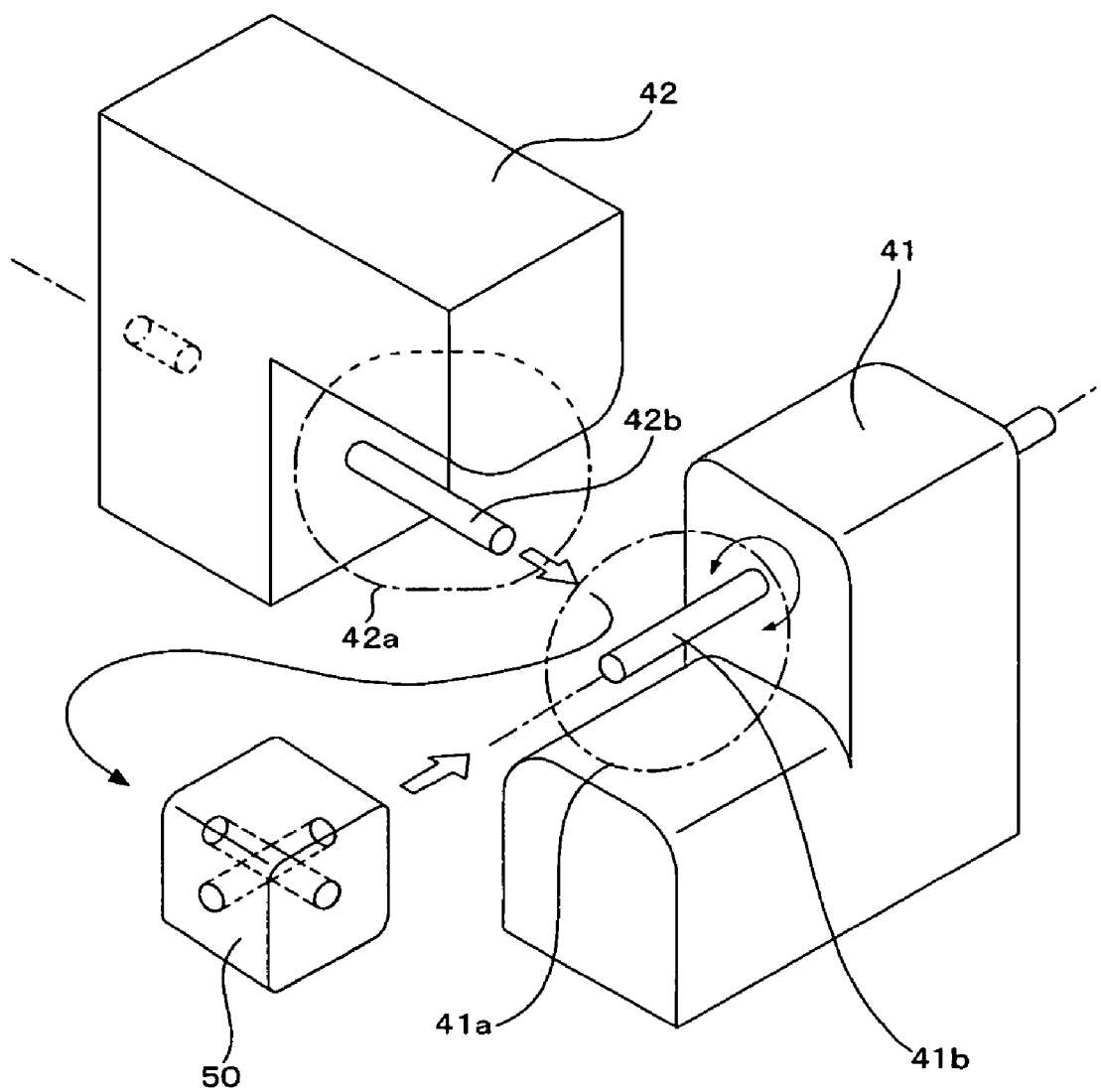
FIG. 3 offers a view for use in description of configuration of a joint servo unit of a robot in accordance with a preferred embodiment of the present invention.

FIG. 3 offers a schematic perspective view for use in description of two robot servo units equipped with the above mentioned reduction mechanisms, the driving motor and the potentiometer. FIG. 3 is used to describe configuration of the above-mentioned two robot servo units.

In FIG. 3, a reference numeral 41 represents a first housing box of a robot servo unit as depicted in FIG. 1, wherein since the first housing box 41 has L-shaped configuration, the connection space 41a surrounded by one dotted chain line can be formed as shown therein.

FIG. 3 shows the situation that an output shaft 41b passes through and is protruded into connection space 41a. A reference numeral 42 represents a second housing box having identical structure and function to that of the first housing box 41. An output shaft 42b of a servo mechanism passes through and is protruded into connection space 42a, wherein since the second housing box 42 has L-shaped configuration, there is formed the connection space 42a surrounded by one dotted chain line as depicted therein.

A reference numeral 50 represents a cross-shaped coupling body having a cross-type through hole formed therein. In fact, as depicted in FIGS. 4A and 4B, edge portion of the cross-shaped coupling body 50 has a round shape (e.g., similar to sphere shape) since it has been roundly cut.

The cross-shaped coupling body 50 is first fitted around the output shaft 41b along a line indicated by an unfilled arrow depicted in FIG. 3 and then fixed therein by using a screw. Then, the output shaft 42b of the second housing box 42 is inserted into the cross-shaped coupling body 50 previously fixed to the first housing box 41 along a line indicated by an arrow depicted in FIG. 3 and then fixed with respect to the cross-shaped coupling body 50. As a result, the first housing box 41 and the second housing box 42 are integrated as one body through the use of the cross-shaped coupling body 50, thereby configuring a robot joint servo system.

Figure 4:
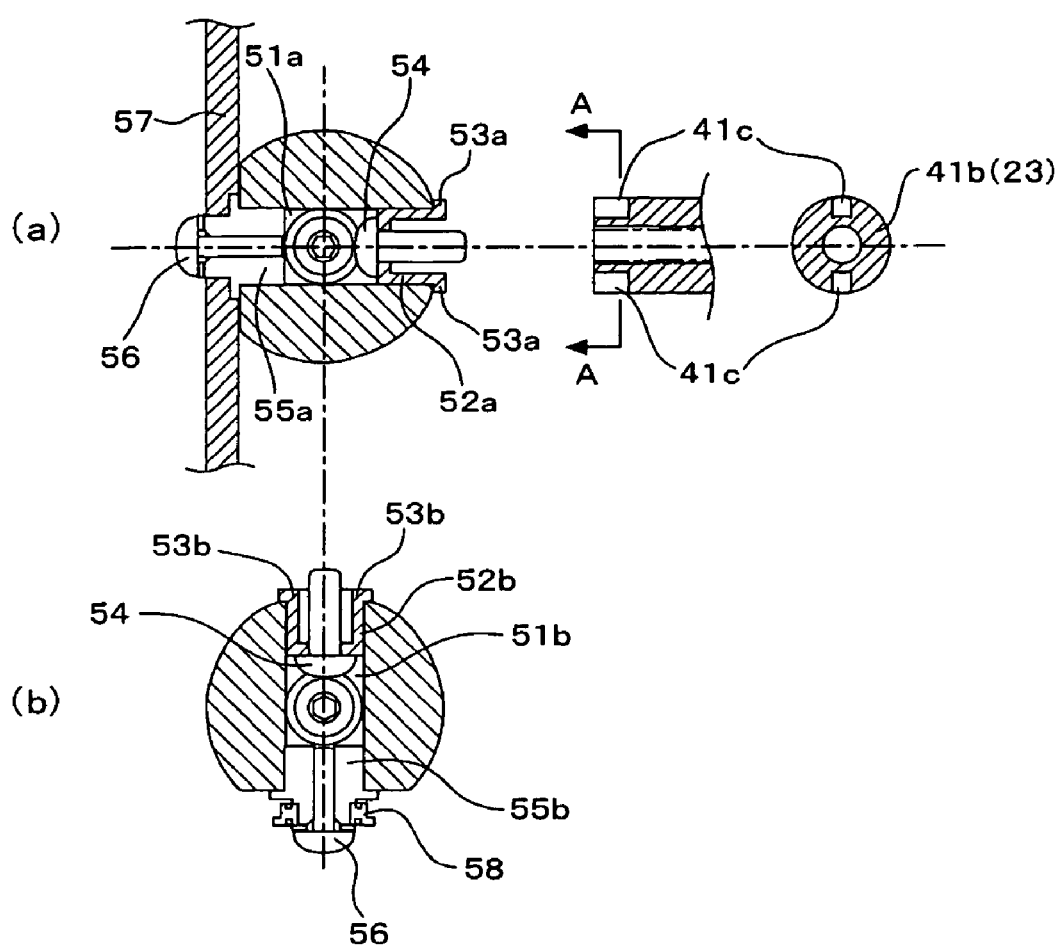
FIGS. 4A and 4B depict cross sectional views of a cross-shaped coupling body and a side cross sectional view of an output shaft thereof in accordance with a preferred embodiment of the present invention.

FIGS. 4A and 4B depict cross sectional views of the cross-shaped coupling body 50 and a side cross sectional view of an output shaft thereof obtained after rotating the output shaft at a right angle (90°) in accordance with a preferred embodiment of the present invention. Reference numerals 51a and 51b represent two through holes. The through holes 51a and 52b are formed by cutting surface portion of a ball type metal with two planes being perpendicular to each other and setting each of through holes 51a and 51b to be passed through with respect to a corresponding cut plane. One end of each of the through holes 51a and 51b is fixed at a right angle to a corresponding output shaft (i.e., 41b and 42b) shown in FIG. 3 by using a screw stopper.

Reference numerals 52a and 52b represent fixing tubes, wherein fixing tubes 52a and 52b are inserted into and then tightly fitted at through holes 51a and 51b, respectively. Referring to FIG. 4A, protruded portions 53a and 53a are formed at end parts facing to sides of the output shafts 41b and 42b, respectively. The protruded portions 53a and 53b are coupled with recessed portions 41c formed at sides of the output shafts 41b(42b), respectively to thereby transmit the rotational force thereof. A reference numeral 54 represents a screw for fixing the output shaft 41b (23) to the cross-shaped coupling body 50.

The other end portions of the two crossed through holes 51a and 51b are inserted into and fixed at fixing rings 55a and 55b, respectively. When the rotational force is transmitted to a certain unit located outside by using a screw 56, a frame 57 under control is fixed thereat as shown in FIG. 4A.

Referring to FIG. 4B, the fixing ring 55b being inserted into and fixed at the through hole 51b is coupled to a shaft supporting plate (not shown) via a bearing 58, thereby reinforcing the rotation of the cross-shaped coupling body 50.

Figure 5:
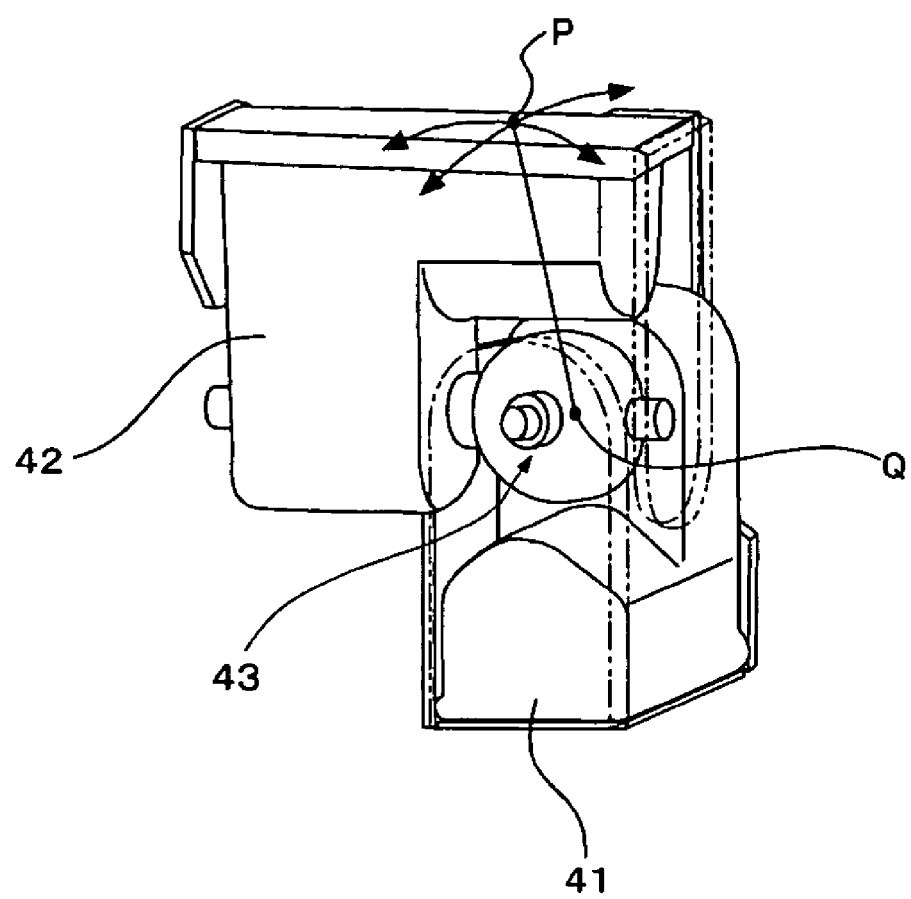
FIG. 5 sets forth a three dimensional view for use in describing configuration of a joint servo unit of a robot in accordance with a preferred embodiment of the present invention.

FIG. 5 sets forth a three dimensional schematic view for use in describing configuration of a joint servo unit of a robot in accordance with a preferred embodiment of the present invention. The first housing box 41 and the second housing box 42 are integrated as one body through the use of a cross-shaped coupling body 43 having a ball shape.

Referring to FIG. 5, it can be understood that a point indicated by "P" on top of the second housing box 42 can be freely rotated in substantially 360° direction, as indicated by two arrows, to a bottom surface of the first housing box 41 with reference to a base coupling point indicated by "Q" on a spherical surface. As a result, a two-degree-of-freedom thereof can be achieved.

The L-shaped connecting space between the first housing box 41 and the second housing box 42 makes the rotational angle of the two shafts large over a protruded surface in order to enlarge the rotation region therebetween. At the same time, output shafts of the two shafts within the connecting space are crossed to each other at a right angle without entailing the so-called offset. In the present invention, a robot joint unit can be provided with lower manufacturing cost by modifying a conventional radio control type servo mechanism. In accordance with the present invention, since the joint part becomes smaller and the output shafts are crossed on a same plane to each other, it is easy to design a program to control motion of the joint unit.

In FIG. 5, there are represented the situation that a shaft support plate indicated by a long dashed double-dotted line is attached thereto in order to reinforce the rotating shaft of the cross-shaped coupling body 43 having a ball shape. However, it should be noted that the shaft support plate is not indispensable.

Figure 6:
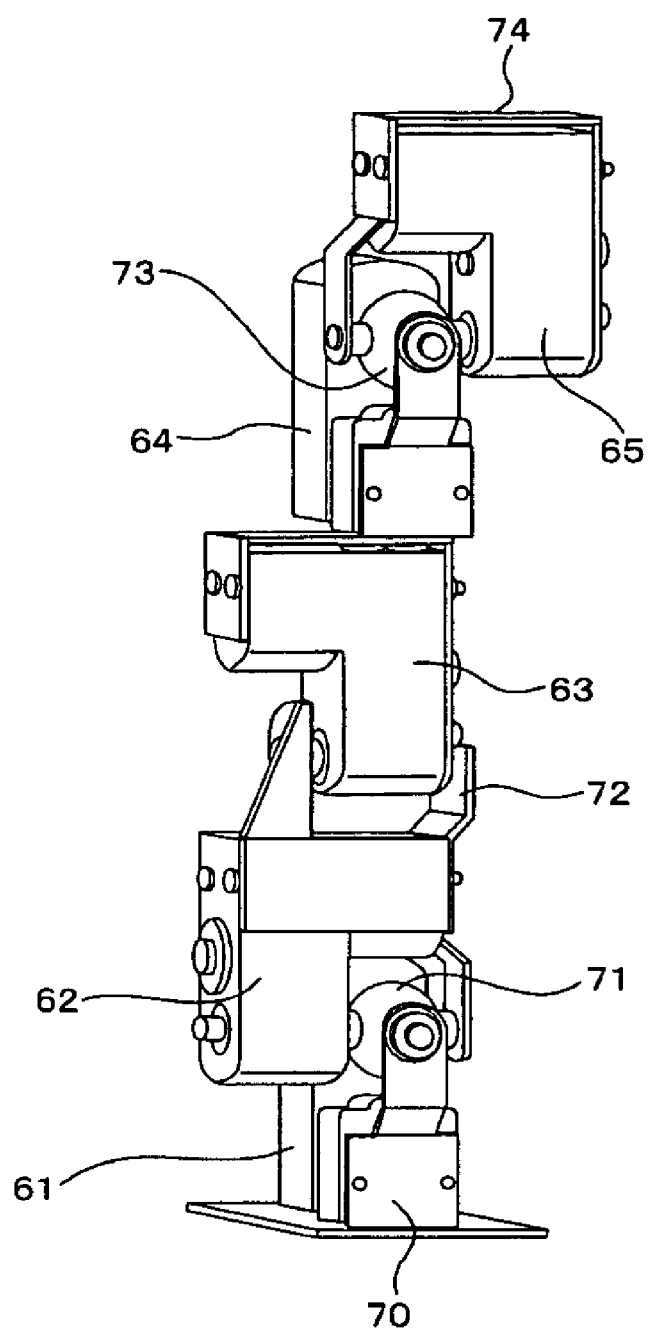
FIG. 6 represents a constitutional view for use in describing a modification example of a joint servo unit of a robot in accordance with a preferred embodiment of the present invention.
Figure 7:
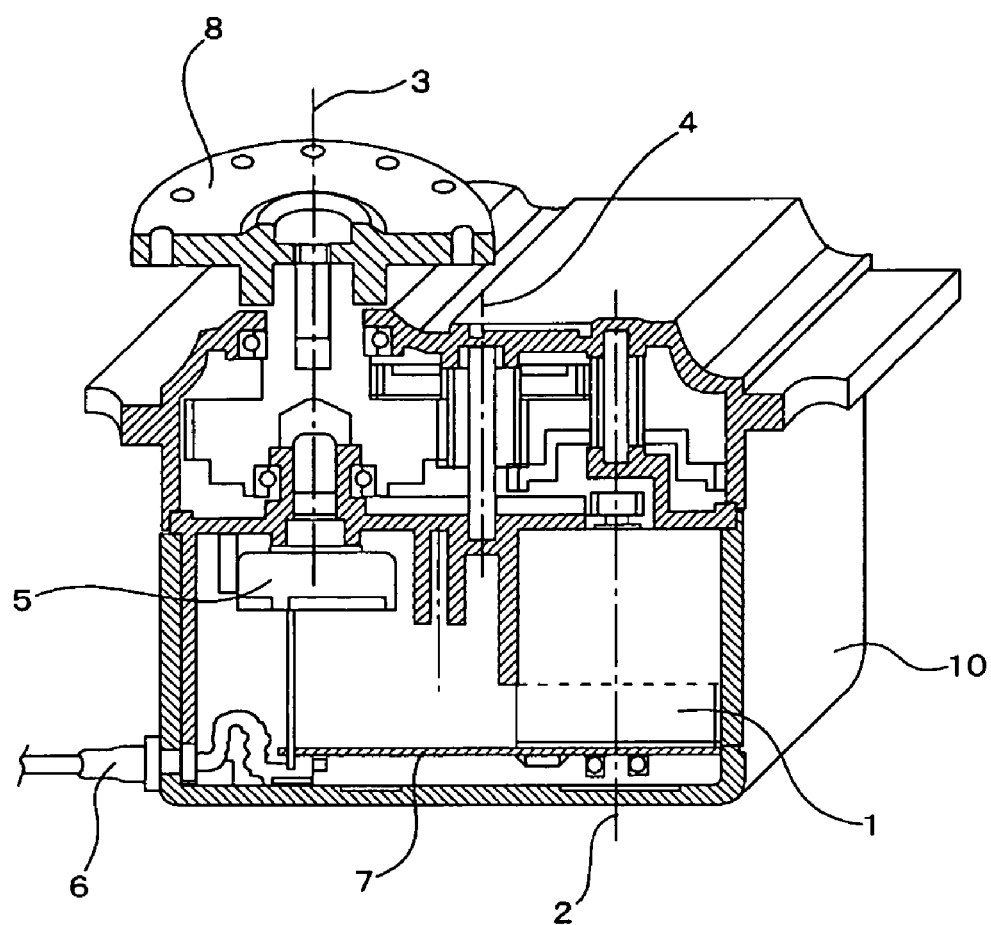
FIG. 7 illustrates a partial cross sectional view of a servo mechanism for the remote control thereof according to a conventional method.
Figure 8:
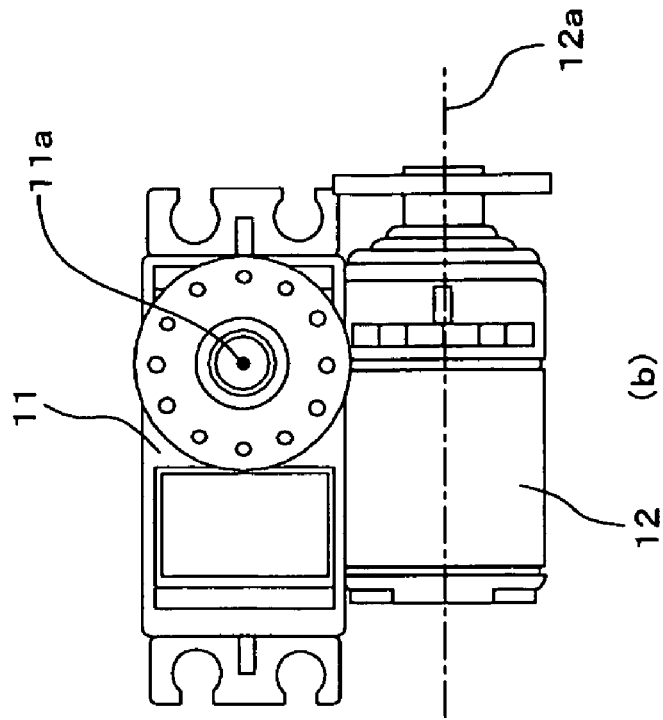
FIG. 8 provides a view for use in description of a two shaft servo system configuration employing conventional servo mechanisms.
Figure 8:
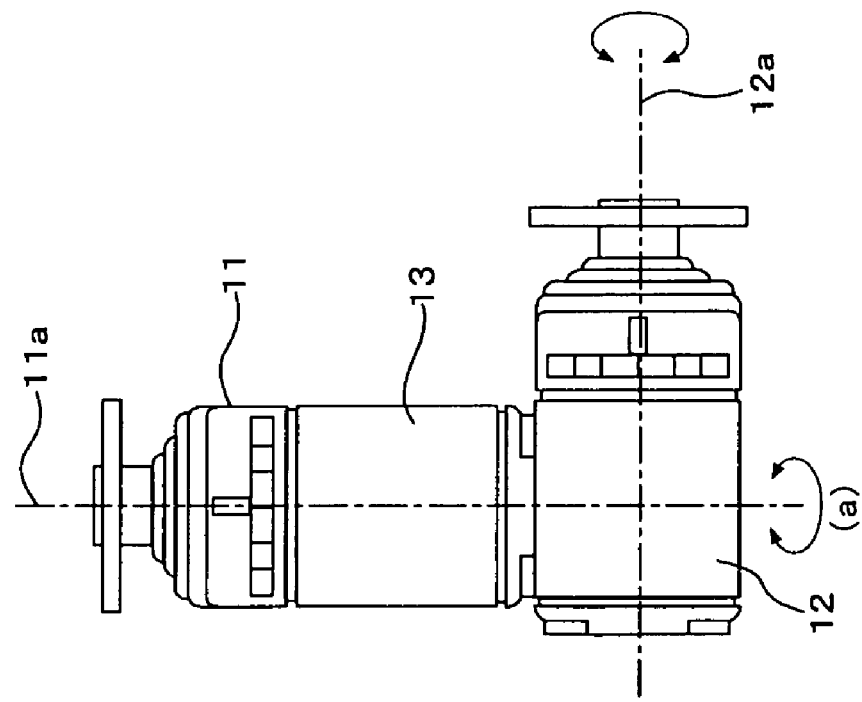
Figure 9:
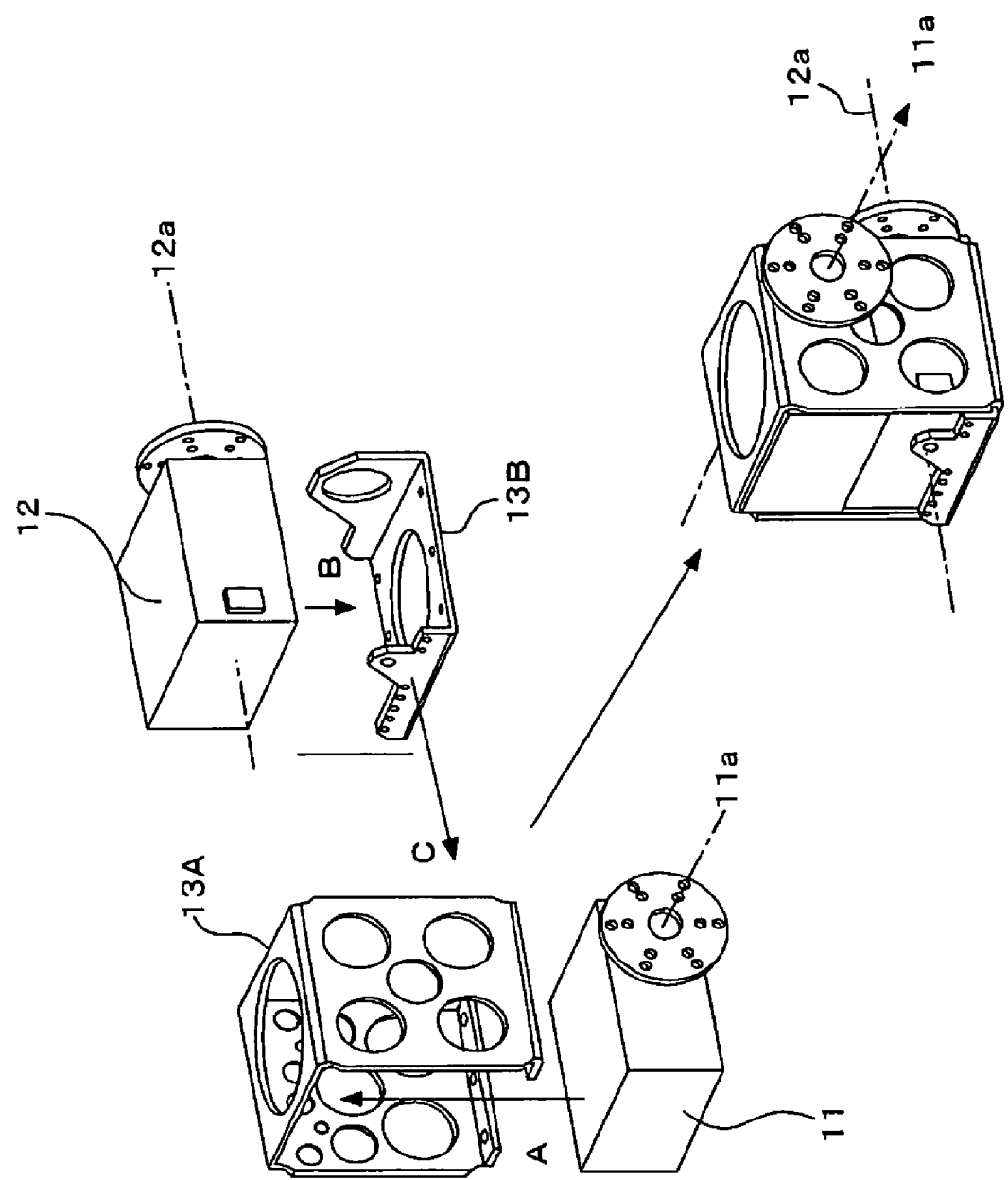
FIG. 9 describes a side perspective view of a two shaft servo configuration employing conventional servo mechanisms.

FIG. 6 represents a constitutional view for use in describing a modification example of a joint servo unit of a robot by assembling a tandem in order to realize motion of a human leg in accordance with a preferred embodiment of the present invention. A reference numeral 70 represents a base corresponding to a foot bottom part, wherein a housing box 61 being used as a first servo is mounted on the base 70. An output shaft of the housing box 61 is coupled in a corresponding connecting space with a housing box 62 being used as a second servo via a cross-shaped coupling body 71 as described above.

The top part of the housing box 62 constitutes a frame member 72 corresponding to a waist of a human body. There is formed a shaft fixing part on top of the frame member 72. An output shaft of a housing box 63 being used as a third servo is rotationally fixed at the shaft fixing part, thereby forming a knee joint part. At the same time, a bottom part of a housing box 64 being used as a fourth servo is fixed on top of the housing box 63.

The housing box 64 and a housing box 65 being used as a fifth servo are connected to each other by using a cross-shaped coupling body 73 located within a corresponding connecting space so that a joint servo having a two-degree-of-freedom is achieved. With this structure, it is possible that motion of a femoral region of a human body is realized. Further, a coupling member to a waist bone part may be installed at a part indicated by a numeral 74.

While a modification example described with reference to FIG. 6 is designed to realize motion of a leg of an artificial robot, it should be noted that a mechanism which is not observable in a human leg can also be accomplished by composing this kind of robot joint servos. Further, a servo unit in accordance with the present invention can be utilized as a joint servo mechanism of an artificial arm.

Since, in accordance with the present invention, a servo unit of a robot and a joint servo of a robot can be prepared and applied to a robot by modifying a conventional model servo mechanism, a servo mechanism of the present invention can be provided with a considerable low cost.

Further, in accordance with the present invention, in realizing a human robot, a joint pat of the human robot may be made with smaller size and higher accuracy.

While the present invention has been described with respect to certain preferred embodiments only, other modifications and variations may be made without departing from the scope of the present invention as set forth in the following claims.

While the invention has been described in detail and with reference to specific embodiments thereof, it will be apparent to one skilled in the art that various changes and modifications can be made therein without departing from the spirit and scope thereof. For example, some or all of the subject matter may be embodied as software, hardware or a combination thereof. Accordingly, it is intended that the present invention covers the modifications and variations of this invention provided they come within the scope of the appended claims and their equivalents.

What is claimed is:

1. A servo unit for use in a robot system comprising:
a driving motor;
one or more reduction mechanisms for reducing rotational speed of the driving motor;
an output shaft which is coupled to a final rotational shaft of said one or more reduction mechanisms; and
a potentiometer for detecting rotational angle variation of the output shaft,
wherein the driving motor, said one or more reduction mechanisms, the output shaft and the potentiometer are installed within a L-shaped housing box and the output shaft faces a connection space formed by the L-shaped housing box.

2. The servo unit of claim 1, wherein the output shaft is installed within the housing box in such a way that the output shaft passes through the housing box.

3. The servo unit of claim 1, wherein the output shaft and a rotational shaft of the potentiometer are coupled with to each other by toothed wheels being composed of elastic resin material.

4. A joint servo for use in a robot system comprising:
a first servo unit including:
a first driving motor;
one or more first reduction mechanisms for reducing rotational speed of the first driving motor;
a first output shaft which is coupled to a final rotational shaft of said one or more first reduction mechanisms; and
a first potentiometer for detecting rotational angle variation of the first output shaft, wherein the first driving motor, said one or more first reduction mechanisms, the first output shaft and the first potentiometer are installed within a L-shaped housing box and the first output shaft faces a connection space formed by the L-shaped housing box; and
a second servo unit including:
a second driving motor;
one or more second reduction mechanisms for reducing rotational speed of the second driving motor;
a second output shaft which is coupled to a final rotational shaft of said one or more second reduction mechanisms; and
a second potentiometer for detecting rotational angle variation of the second output shaft, wherein the second driving motor, said one or more second reduction mechanisms, the second output shaft and the second potentiometer are installed within a L-shaped housing box and the second output shaft faces a connection space formed by the L-shaped housing box,
wherein the first output shaft and the second output shaft are inserted into a cross-shaped coupling body, thereby rendering the two output shafts to be crossed with each other and fixed within the connection space.

5. A servo unit for use in a robot system comprising:
an L-shaped housing defining a connection space;
a driving motor to generate a rotational speed;
one or more reduction mechanisms operable to reduce the rotational speed of the driving motor, the one or more reduction mechanisms each including a final rotational shaft;
an output shaft coupled to the final rotational shaft of said one or more reduction mechanisms, the output shaft generating a rotational angle variation; and
a potentiometer operable to detect the rotational angle variation of the output shaft;
wherein the driving motor, the one or more reduction mechanisms, the output shaft, and the potentiometer are disposed within the housing, and wherein the output shaft is oriented within the housing such that it extends from the housing into the connection space defined by the housing.

6. A servo unit for use in a robot system comprising:
a driving motor;
one or more reduction mechanisms for reducing rotational speed of the driving motor;
an output shaft coupled to a final rotational shaft of said one or more reduction mechanisms;
a potentiometer to detect rotational angle variation of the output shaft; and
an L-shaped housing to house the driving motor, said one or more reduction mechanisms, the output shaft, and the potentiometer therein, wherein the output shaft faces a connection spaced formed by the L-shaped housing box.

7. The servo unit of claim 1, wherein the L-shaped housing is defined by a first housing portion and a second housing portion oriented perpendicular to the first housing portion, wherein the second housing portion is in communication with the first housing portion.

8. The servo unit of claim 7, wherein the output shaft extends along an axis that is parallel to the first housing portion and perpendicular to the second housing portion.

9. The servo unit of claim 7, wherein:
the driving motor is disposed within the first housing portion;
the one or more reduction mechanisms is disposed in the second housing portion; and
the output shaft entirely though the second housing portion.

10. The servo unit of claim 1, wherein:
the potentiometer includes a rotatable potentiometer shaft; and
the output shaft is oriented parallel with respect to the potentiometer shaft.

11. The servo unit of claim 10, wherein:
the motor further comprises a motor shaft; and
the potentiometer shaft is oriented parallel to the motor shaft.

12. The servo unit of claim 5, wherein the L-shaped housing is defined by a first housing portion and a second housing portion oriented perpendicular to the first housing portion.

13. The servo unit of claim 12, wherein the output shaft is oriented along an axis that is parallel to the first housing portion and perpendicular to the second housing portion.

14. The servo unit of claim 12, wherein the output shaft extends entirely through the second housing portion.

15. The servo unit of claim 5, wherein, the potentiometer comprises a potentiometer shaft oriented generally parallel with respect to each of the output shaft and the final rotational shaft of the reduction mechanism.

16. The servo unit of claim 6, wherein the L-shaped housing is defined by a first leg and a second leg oriented perpendicular to the first leg.

17. The servo unit of claim 6, wherein output shaft is oriented parallel to first leg and perpendicular to second leg.

18. The servo unit of claim 17, wherein the output shaft extends entirely through the second leg.

19. The servo unit of claim 6, wherein:
the one or more reduction mechanisms includes a final rotational shaft; and
the potentiometer comprises a potentiometer shaft disposed generally parallel to each of the output shaft and the final rotational shaft of the reduction mechanism.

* * * * *

UNITED STATES PATENT AND TRADEMARK OFFICE
CERTIFICATE OF CORRECTION

PATENT NO. : 7,429,844 B2  Page 1 of 1
APPLICATION NO. : 11/195780
DATED : September 30, 2008
INVENTOR(S) : Toru Kono et al.

It is certified that error appears in the above-identified patent and that said Letters Patent is hereby corrected as shown below:

Col. 9, in claim 9, line 6, delete the term "though" and replace with the term -- through --.

Signed and Sealed this

Second Day of December, 2008

JON W. DUDAS
*Director of the United States Patent and Trademark Office*

UNITED STATES PATENT AND TRADEMARK OFFICE
CERTIFICATE OF CORRECTION

PATENT NO.        : 7,429,844 B2                                           Page 1 of 1
APPLICATION NO.   : 11/195780
DATED             : September 30, 2008
INVENTOR(S)       : Toru Kono et al.

It is certified that error appears in the above-identified patent and that said Letters Patent is hereby corrected as shown below:

Col. 9, in claim 9, line 12, delete the term "though" and replace with the term
-- through --.

This certificate supersedes the Certificate of Correction issued December 2, 2008.

Signed and Sealed this

Twenty-third Day of December, 2008

JON W. DUDAS
*Director of the United States Patent and Trademark Office*